United States Patent [19]

Bauer

[11] Patent Number: 5,229,462
[45] Date of Patent: Jul. 20, 1993

[54] POLYPROPLENE-HIGH TRANS 1,4-POLYBUTADIENE BLENDS

[75] Inventor: Richard G. Bauer, Kent, Ohio

[73] Assignee: The Goodyear Tire & Rubber Company, Akron, Ohio

[21] Appl. No.: 729,272

[22] Filed: Jul. 12, 1991

[51] Int. Cl.$^5$ .............. C08L 23/12; C08L 9/00; C08L 23/26; C08L 23/36
[52] U.S. Cl. .................... 525/193; 525/194; 525/232
[58] Field of Search ............ 525/232, 193, 194

[56] References Cited

U.S. PATENT DOCUMENTS

| | | | |
|---|---|---|---|
| 3,037,954 | 6/1962 | Gessler et al. | 260/29.8 |
| 3,758,643 | 9/1973 | Fischer | 260/897 A |
| 3,806,558 | 4/1974 | Fischer | 260/897 A |
| 3,926,933 | 12/1975 | Naylor | 526/335 |
| 4,104,210 | 8/1978 | Coran et al. | 260/4 R |
| 4,202,801 | 5/1980 | Petersen | 260/5 |
| 4,220,579 | 9/1980 | Rinehart | 260/33.6 AQ |
| 4,271,049 | 6/1981 | Coran et al. | 525/232 |
| 4,338,413 | 7/1982 | Coran et al. | 525/179 |
| 4,423,181 | 12/1983 | Kent | 525/236 |
| 4,426,497 | 1/1984 | Kent | 525/232 |
| 4,442,233 | 4/1984 | Lohmar et al. | 525/232 |
| 4,510,291 | 4/1985 | Kawakami | 525/237 |
| 4,593,062 | 6/1986 | Puydak et al. | 524/426 |
| 4,829,125 | 5/1989 | Yeo et al. | 525/194 |
| 4,914,138 | 4/1990 | Percec et al. | 525/71 |
| 5,023,301 | 6/1991 | Burlett et al. | 525/236 |

FOREIGN PATENT DOCUMENTS

| | | |
|---|---|---|
| 1212724 | 3/1966 | Fed. Rep. of Germany . |
| 1327565 | 4/1963 | France . |
| 1871967 | 10/1967 | Japan . |
| 8501983 | 12/1983 | Japan . |
| 2521984 | 12/1984 | Japan . |
| 1297198 | 5/1985 | Japan . |

OTHER PUBLICATIONS

Mathew et al., Impact-Resistant Polypropylene/Natural Rubber Blends, J. Nat. Rubb. Rese., 1(4) 240–246.

A. J. Tinker, Preparation of Polypropylene/Natural Rubber Blends Having High Impact Strength at Low Temperatures, Polymer Communications 25, No. 11, 325 (1984).

D. J. Elliott, Some Properties and Prospects of Thermoplastic Natural Rubber Blends, Kaut. U. Gummi, Kunst. 39, No. 7, Jul. 1986, pp. 621–624.

Primary Examiner—Carman J. Seccuro, Jr.
Attorney, Agent, or Firm—Bruce J. Hendricks

[57] ABSTRACT

The present invention relates to a blend of polypropylene and a trans-1,4-polybutadiene rubber in which the content of trans-1,4 bonds is 65 weight percent or more.

4 Claims, No Drawings

POLYPROPLENE-HIGH TRANS 1,4-POLYBUTADIENE BLENDS

BACKGROUND OF THE INVENTION

Thermoplastic blends containing mixtures of dissimilar plastics and dissimilar rubbers are known. For example, in U.S. Pat. No. 4,338,413, there is described a ternary blend of about 20 to 98 parts by weight of a plastic and about 80 to 2 parts by weight of cured particulate rubber. The plastic comprises about 10 to 90 parts by weight of crystalline polyolefin polymer and 90 to 10 parts by weight of nylon. An example of a crystalline polyolefin polymer is polypropylene. Examples of cured particulate rubber include EPDM, nitrile rubber, natural or synthetic polyisoprene rubber, styrene-butadiene rubber, polybutadiene rubber and polyisobutylene rubber. One undesirable aspect of such blends is that the properties of the blend generally lack any practical utility because of the significant disparity of the individual component polymers. However, the opportunities for meeting various applications of polymeric blends continue.

SUMMARY OF THE INVENTION

The present invention relates to a blend of about 1 to 99 parts by weight of polypropylene and about 99 to 1 parts by weight of trans-1,4-polybutadiene rubber in which the content of trans-1,4 bonds is at least 65% or more.

The polypropylene used in the blends of the present invention is a crystalline, high molecular weight polymer which is derived from the polymerization of propylene monomer through the use of catalyst systems. Its crystallinity is due to the stereospecific arrangement of the polymer molecule and imparts well known strength and durability properties. The polypropylene used in the blends of the present invention is the so-called isotactic polypropylene as opposed to atactic polypropylene. Atactic polypropylene is characterized by molecular structure wherein the methyl groups are arranged and aligned on the same side of the polymer chain. Generally, the number average molecular weight of polypropylene is typically in excess of about 100,000. Polypropylene of this type are further described in the Kirk-Othmer Encyclopedia of Chemical Technology, Volume 14, (1967) and U.S. Pat. Nos. 3,112,300 and 3,112,301, incorporated herein by reference.

Polypropylenes are characterized by low densities (specific gravity about 0.90–0.91) and high melting points (about 167° C.).

Polypropylene is produced commercially in numerous grades and formulations. Molding and extrusion grades are available in low-medium and high melt flows as well as medium- or high-impact types, heat and ultraviolet radiation stable formulations and resins with controlled crystallinity.

Suitable polypropylene as previously defined can be prepared by methods well known to those skilled in the art or can be obtained commercially. For example, commercial polypropylene is generally prepared using a solid, crystalline, hydrocarbon-insoluble catalyst made from a titanium trichloride composition and an aluminum alkyl compound, e.g., triethylaluminum or diethylaluminum chloride. Depending on the specific catalyst and polymerization conditions employed, the polymer produced may contain atactic as well as isotactic, syndiotactic or so-called stereo-block molecules. These can be separated, if desired, by selective solvent extraction to yield products of low atactic content that crystallize more completely. Polypropylene which may be used to prepare the polymeric blends of the present invention is commercially available from a number of manufacturers including General Polymers Division of Ashland Chemical Company, Columbus, Ohio, Shuman Plastics of Buffalo, N.Y. and Eastman Chemical Products, Inc., Plastics Division, Rochester, N.Y. Polypropylenes are commercially available in ⅛ inch pellets which is suitable for use in the present invention.

The other essential component of the present invention is high trans-1,4-polybutadiene (sometimes hereinafter referred to as HTPD). The use of trans-1,4-polybutadiene has been disclosed for various purposes, including, for example, tire tread compounds and increasing green strength of rubber mixtures (see Japanese Patent Publication No. 60-133,036; 62-101,504 and 61-143,453) and U.S. Pat. No. 4,510,291. The trans-1,4-polybutadiene for use in the present invention has at least 65 weight percent of trans-1,4 bonds. Generally speaking, the weight percent of 1,4 bonds ranges from about 65 to about 90, with about 20 to 5 weight percent of its units of a vinyl 1,2-structure and 15 to 2 weight percent of its units of a cis-1,4-structure. Preferably, such trans-1,4-polybutadiene is characterized by having about 75 to an 85 weight percent of its butadiene weight units of a trans-1,4-isomeric structure, about 12 to 18 percent of its units of a vinyl 1,2-structure and 2 to about 8 percent of its units of a cis-1,4-structure. In its uncured state the trans-1,4-polybutadiene exhibits two distinct melting points, a major melting point and a minor melting point. The first major melting point is in the range of about 35° C. to about 45° C. and the second minor melting point is in a range from about 55° C. to about 65° C. Preferably, the first and second melting points are separated by at least 15° C. and usually about 20° C.

Trans-1,4-polybutadiene is normally prepared utilizing transition metal catalysts or rare earth catalysts. The synthesis of trans-1,4-polybutadiene with transition metal catalysts is described by J. Boor, Jr., "Ziegler-Natta Catalysts and Polymerizations", Academic Press, New York, 1979, Chapters 5–6. The synthesis of trans-1,4-polybutadiene with rare earth metal catalysts is described by D. K. Jenkins, Polymer, 26, 144 (1985).

Depending on the desired properties of the resulting blend, one may vary the ratios of the polypropylene and HTPD. Generally speaking, the various weight percentages of the components may range from about 1 to 99 percent of the polypropylene with 99 to 1 weight percent of the HTPD. Preferably, the weight percentage of polypropylene ranges from about 60 to about 90 with the weight percent of HTPD ranging from about 40 to about 10. At the higher weight percentages of polypropylene, one sees a trend to increased tensile strength of the blend whereas at the higher weight percentages of the HTPD, one gets increased elongation values at break. Surprisingly, blends containing certain weight percentages of each component may have a tensile strength or elongation at break much higher than the high trans polybutadiene component or polypropylene component alone.

In a preferred embodiment of the present invention, a compatibilizer is used in the polymer blend. The compatibilizer is used in amounts sufficient to facilitate the dispersion of the polypropylene and high trans polybutadiene. Examples of suitable compatibilizing agents include peroxides, sulfur compounds and bismaleimides. Specific compatibilizing agents include m-phenylenebismaleimide, elemental sulfur, and thiuram disulfide. The level of compatibilizer may vary. For example, it may range from about 0.01 to about 2.0 parts per 100 parts of the polypropylene and high trans polybutadiene combined. Preferably, the compatibilizer is used in an amount from about 0.25 to 0.75 parts per 100 parts of the blend.

It is contemplated that the blends of the present invention may also include additive materials such as fillers, stabilizers, plasticizers, flexibilizers, surfactant agents, pigments, dies, reinforcement agents, flame retardants and diluents in conventional amounts. It is also contemplated that the blends of the present invention may include two or more polypropylenes with one or more high trans polybutadienes.

Methods for forming the blends of the present invention may vary considerably. Prior art blending techniques are generally satisfactory. The preferred method comprises blending the polymers and additives such as reinforcements in powder, granular or filamentious form, extruding the blend and chopping the extrudate into pellets suitable for molding by means conventionally used to mold normally solid thermoplastic compositions.

The blends of the present invention have application in a wide variety of physical shapes and forms, including the use as films, molding compounds, coatings, etc. Other applications which are contemplated for the blends of the present invention include wire jackets, hoses, boots, shoe soles, bumper covers, tire compounds and their use as binders for asbestos fibers, carbon fibers, and other fibrous materials.

The following examples are presented in order to illustrate various aspects of the present invention. In the examples, all parts and percentages are by weight unless otherwise specified.

EXAMPLE 1

A series of polypropylene high trans polybutadiene was prepared. For purposes of comparison, a series of polypropylene high cis polybutadiene were prepared. The blends were molded into test specimens and the specimens tested for various physical properties.

The isotactic polypropylene was in the form of ⅛ inch (32 mm) pellets and was purchased from General Polymers Division of Ashland Chemical Company under the designation 5520.

The trans 1,4-polybutadiene had about 84% trans 1,4-content, a cis 1,4 of about 2 percent and a vinyl 1,2 content of about 14 percent. It was further characterized by a Mooney viscosity of 54, a Tg of about -78° C. and melting points of 41° C. (major) and 62° C. (minor).

The high cis-1,4 polybutadiene that was used is commercially available from The Goodyear Tire & Rubber Company under the designation Budene ®1207 and has a cis-1,4 content of about 97 percent, 1% trans-1,4 content, and 2% vinyl-1,2 content. The Mooney viscosity (ML4' @ 212° F.) was 50 to 60, a Tg of -104° C., a melting point of -4.2° C. and a dilute solution viscosity of 2.8.

Into a 250 ml electrically heated Brabender mixer was charged the polypropylene, respective polybutadiene and 0.5 parts of antioxidant. The antioxidant was commercially available from The Goodyear Tire & Rubber Company. The materials were allowed to mix at 125 rpm for 2 to 4 minutes to final temperatures of from 173°-190° C. Table I below provides the respective amounts of the components of the blend along with the properties of each blend. For each blend, five specimens were tested and Table I provides the mean average of the five specimens for each property.

Youngs Modulus E for a blend is defined as the ratio of tensile stress to tensile strain, or $$E = \frac{\text{tensile stress } \sigma}{\text{tensile strain } E} = \frac{\text{Force per unit area}}{\text{Stretch per unit length}}$$

The stress is defined as the force per unit area of cross-section. The elongation or strain is defined as $$E = \frac{\Delta L}{L_o}$$

$\Delta L$ is the incremental increase in elongation or specimen length under a load. $L_o$ is the initial length of the sample.

TABLE I

| Sample | 1 Control | 2 | 3 Control | 4 | 5 Control | 6 | 7 Control | 8 |
|---|---|---|---|---|---|---|---|---|
| Polyproplene | 80 | 80 | 60 | 60 | 40 | 40 | 20 | 20 |
| HTPBD[1] | — | 20 | — | 40 | — | 60 | — | 80 |
| HCPBD[2] | 20 | — | 40 | — | 60 | — | 80 | — |
| Tensile @ Yield (MPa) | 15.39 | 17.14 | 7.69 | 11.01 | 3.65 | 6.57 | — | — |
| Elongation @ Yield (%) | 5.68 | 7.72 | 7.23 | 8.57 | 11.86 | 26.07 | — | — |
| Tensile @ Break (MPa) | 14.01 | 16.40 | 7.91 | 10.67 | 4.03 | 6.46 | 0.88 | 1.98 |
| Elongation @ Break (%) | 44.34 | 16.70 | 48.17 | 32.32 | 76.50 | 73.71 | 36.34 | 23.96 |
| Young's Modulus (MPa) | 711.39 | 774.18 | 369.50 | 466.44 | 148.97 | 185.54 | 8.95 | 28.81 |

[1]High trans 1,4-polybutadiene
[1]High cis 1,4-polybutadiene

It can be seen in Table I that the tensile strengths at break and Young's Modulus for all of the high trans-polybutadiene containing blends are higher than those for the corresponding values for the high cis-polybutadiene.

EXAMPLE 2

A series of polypropylene-high trans polybutadiene was prepared. The polypropylene and high trans polybutadiene used in Example 1 were used. Each blend was molded into two test specimens and the specimens tested for various physical properties.

The high trans polybutadiene was placed in a 250 ml electrically heated Brabender mixer. While mixing at 30 rpm, the m-phenylene bismaleimide (BMA), 0.5 parts of Wingstay ® K and the polypropylene were added to the Brabender. The material was allowed to mix for 5 to 8 minutes at a temperature from 170°-190° C. Table II below provides the respective amounts of the components of the blend along with the average properties of the two specimens made from each blend.

TABLE II

| Sample | 1 | 2 | 3 | 4 | 5 | 6 | 7 | 8 |
|---|---|---|---|---|---|---|---|---|
| Polypropylene | 10 | 20 | 40 | 60 | 80 | 80 | 90 | 90 |
| HTPBD | 90 | 80 | 60 | 40 | 20 | 20 | 10 | 10 |
| BMA | 1.0 | 1.0 | 1.0 | 1.0 | 1.0 | 0.25 | 1.0 | 0.25 |
| Tensile Strength @ Break (MPa) | 2.54 | 4.75 | 8.41 | 13.15 | 22.2 | 23.3 | 18.25 | 20.2 |
| Elongation @ Break (%) | 205 | 362.5 | 130 | 95 | 165 | 282.5 | 187.5 | 306 |

The use of a compatibilizing agent, such as m-phenylene bismaleimide is illustrated in Table II. It can be seen that blends that were prepared in the presence of such a compatibilizing agent (Table II) generally have superior ultimate tensile properties than those that do not contain such a compatibilizing agent (Table I).

What is claimed is:

1. A composition comprising a blend of (a) about 1 to 99 parts by weight of polypropylene and (b) about 99 to 1 parts by weight of trans 1,4-polybutadiene rubber wherein the trans 1,4-polybutadiene rubber has a 75 to 85 weight percent of its butadiene weight units of trans 1,4-isomeric structure, about 12 to 18 weight percent of its units of a vinyl 1,2-structure and 2 to 8 weight percent of its units of a cis-1,4-structure and in its uncured state the trans 1,4-polybutadiene exhibits a first major melting point ranging from about 35° C. to about 45° C. and a second minor melting point ranging from about 55° C. to 65° C. and the first and second melting points are separated by at least 15° C.

2. The composition of claim 1 comprising a blend of from about (a) from about 60 to about 90 parts by weight of polypropylene and (b) about 40 to about 10 parts by weight of a trans 1,4-polybutadiene.

3. The composition of claim 1 wherein in addition to the polypropylene and trans-1,4-polybutadiene, a compatibilizing agent is used which is selected from the group consisting of peroxides, sulfur compounds and bismaleimides.

4. The composition of claim 3 wherein the compatibilizing agent is m-phenylenebismaleimide.

* * * * *